(12) United States Patent
Bradley et al.

(10) Patent No.: US 7,077,580 B2
(45) Date of Patent: Jul. 18, 2006

(54) FIBER-OPTIC CONNECTORS AND RELATED METHODS

(75) Inventors: Kelvin B. Bradley, Lilburn, GA (US); William A. Vicory, Suwanee, GA (US); Ian A. White, Dunwoody, GA (US); Jeffrey H. Hicks, Jeannette, PA (US)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 10/694,100

(22) Filed: Oct. 27, 2003

(65) Prior Publication Data

US 2005/0089278 A1    Apr. 28, 2005

(51) Int. Cl.
*G02B 6/255* (2006.01)
(52) U.S. Cl. ......................... 385/98; 385/134
(58) Field of Classification Search .................. 385/59, 385/95–98, 71, 114, 134, 136
See application file for complete search history.

(56) References Cited

U.S. PATENT DOCUMENTS

| | | | |
|---|---|---|---|
| 5,042,902 A | 8/1991 | Huebscher et al. | 385/72 |
| 5,138,681 A | 8/1992 | Larson et al. | 385/95 |
| 5,151,964 A | 9/1992 | Carpenter et al. | 385/98 |
| 5,155,781 A | 10/1992 | Doss et al. | 385/71 |
| 5,155,787 A | 10/1992 | Carpenter et al. | 385/98 |
| 5,440,657 A | 8/1995 | Essert | 385/71 |

FOREIGN PATENT DOCUMENTS

| | | |
|---|---|---|
| JP | 55096912 | 7/1980 |
| JP | 02039111 | 8/1990 |
| JP | 8240742 | 9/1996 |

*Primary Examiner*—Khiem Nguyen
(74) *Attorney, Agent, or Firm*—Thomas, Kayden, Horstemeyer & Risley, LLP

(57) ABSTRACT

Fiber-optic connectors and methods for coupling optical fibers via the fiber-optic connectors are disclosed. Once such fiber-optic connector includes: 1) a socket having a tunnel extending through a portion of the socket, the tunnel having first opening through a first socket surface and a second opening through a second socket surface, the first surface being opposed to the second surface, 2) a first plug having a first prong that is configured to support a portion of a first optical fiber, and that is configured to be inserted with the portion of the first optical fiber into the first opening, and 3) a second plug having a second prong that is configured to support a portion of a second optical fiber, and that is configured to be inserted with the portion of the second optical fiber into the second opening.

17 Claims, 11 Drawing Sheets

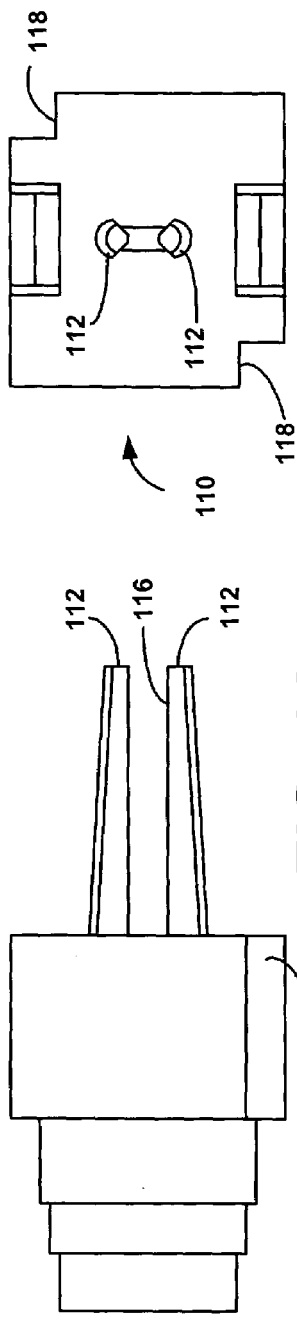
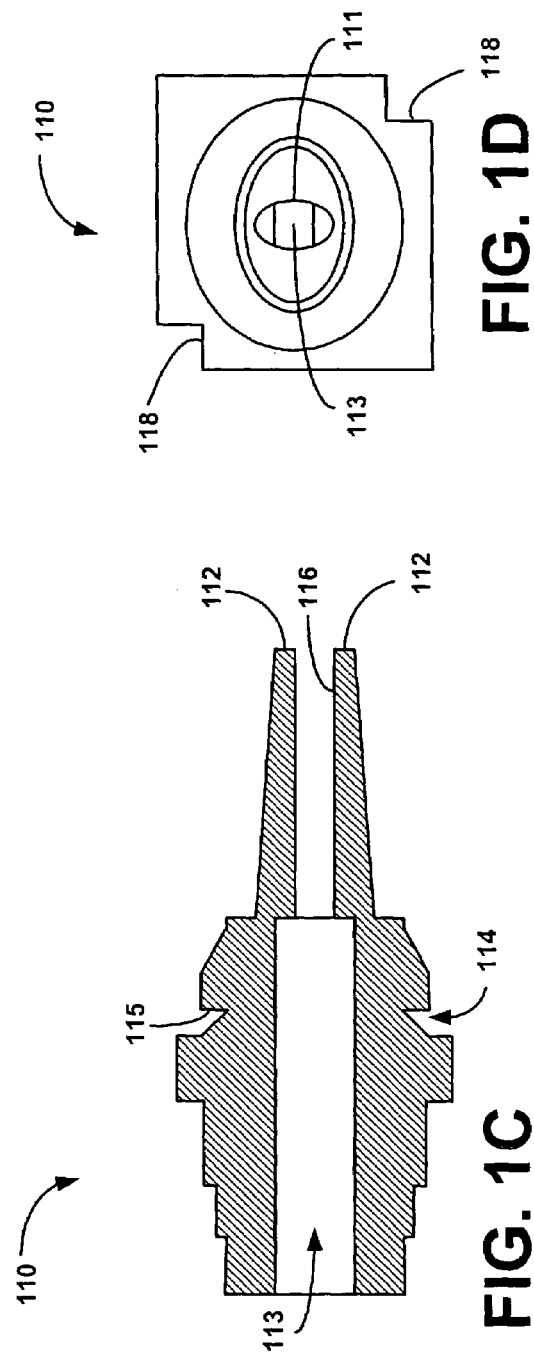

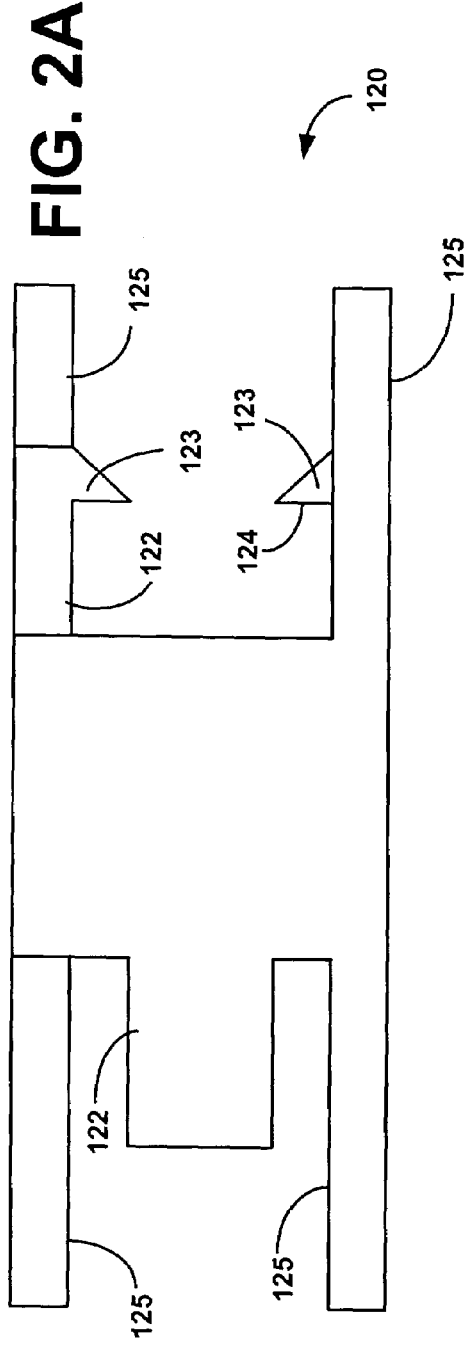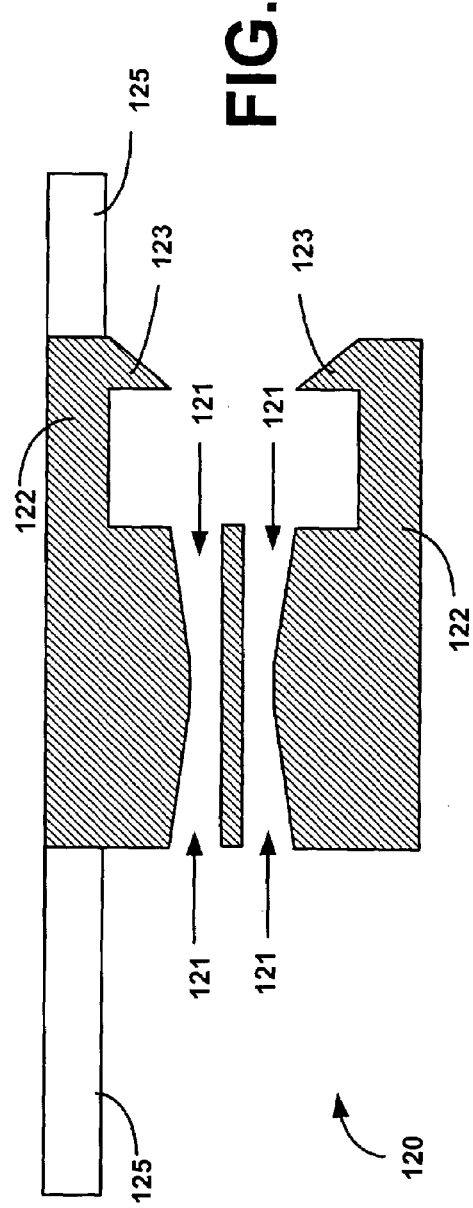

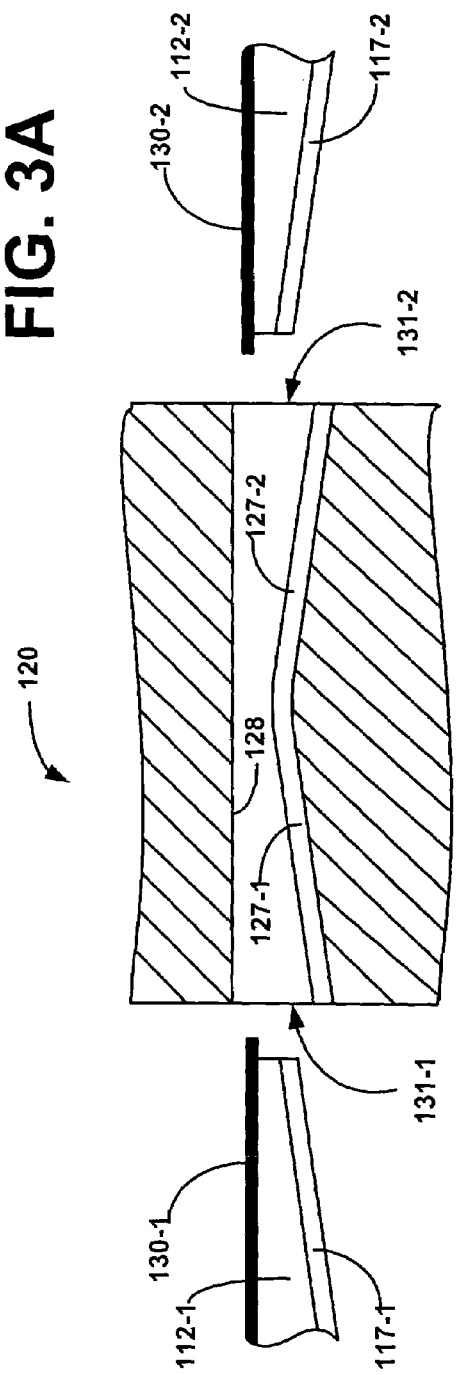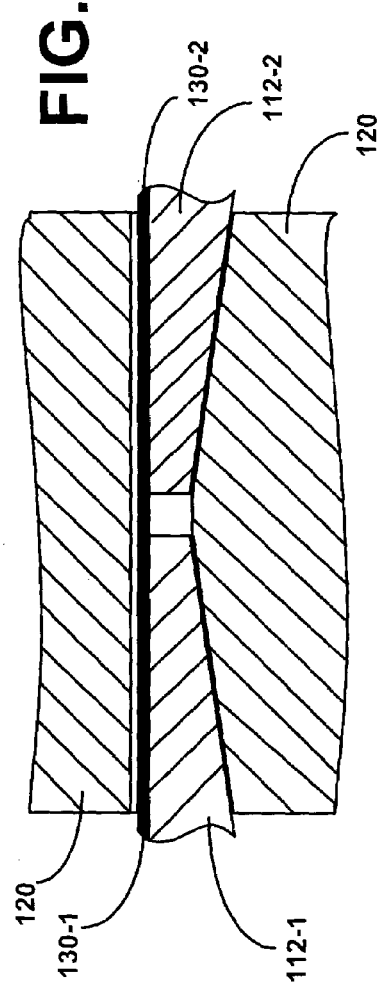

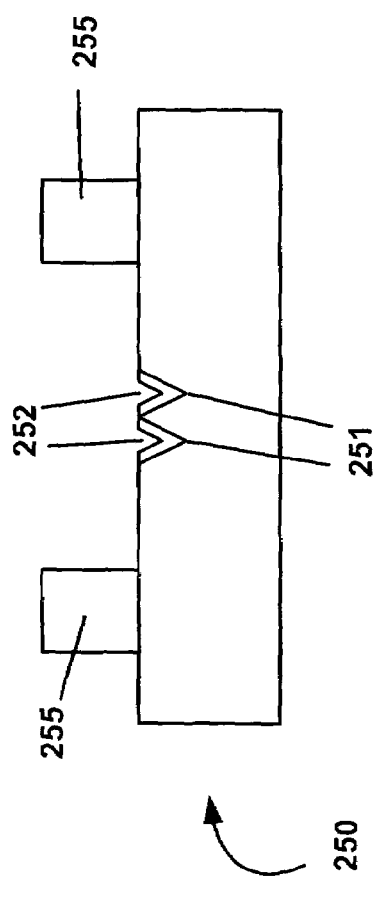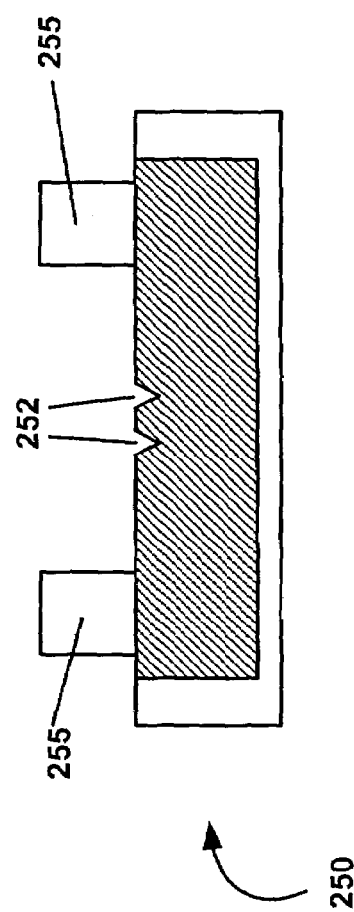

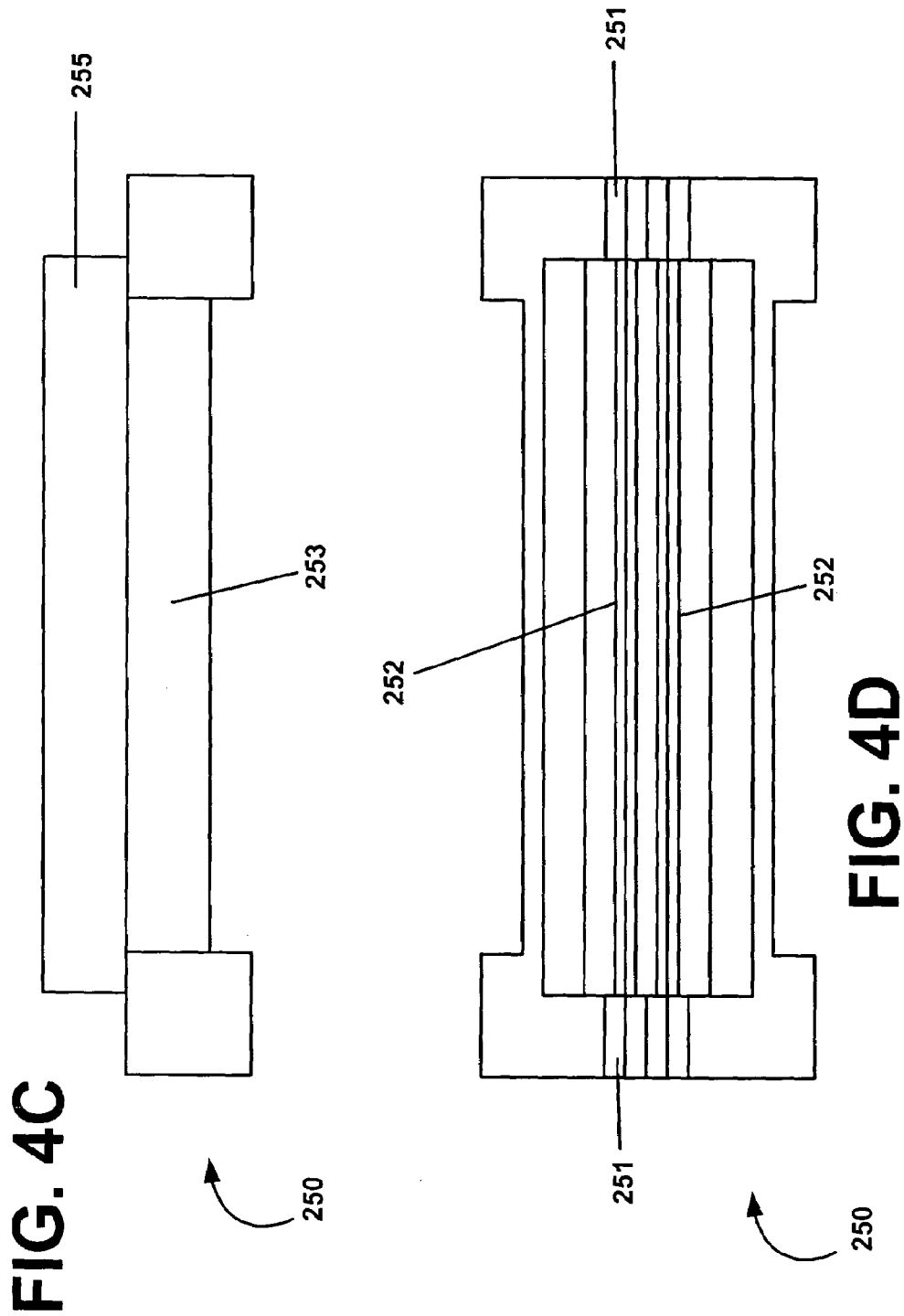

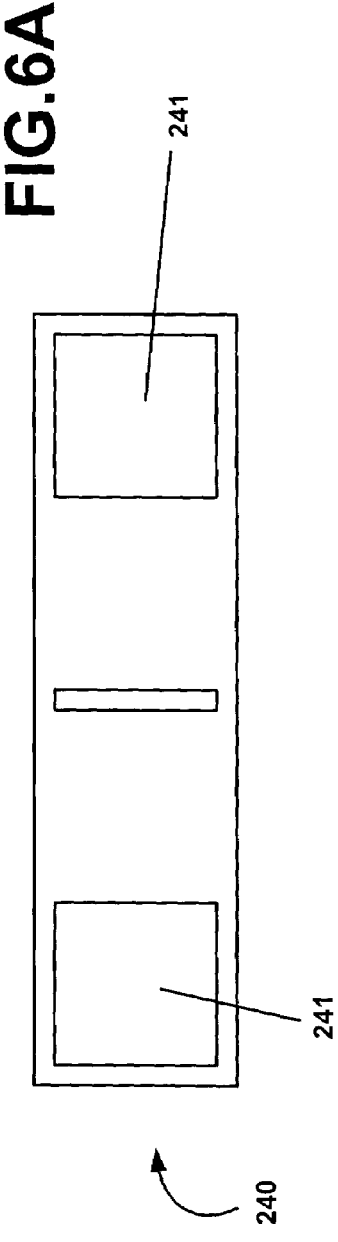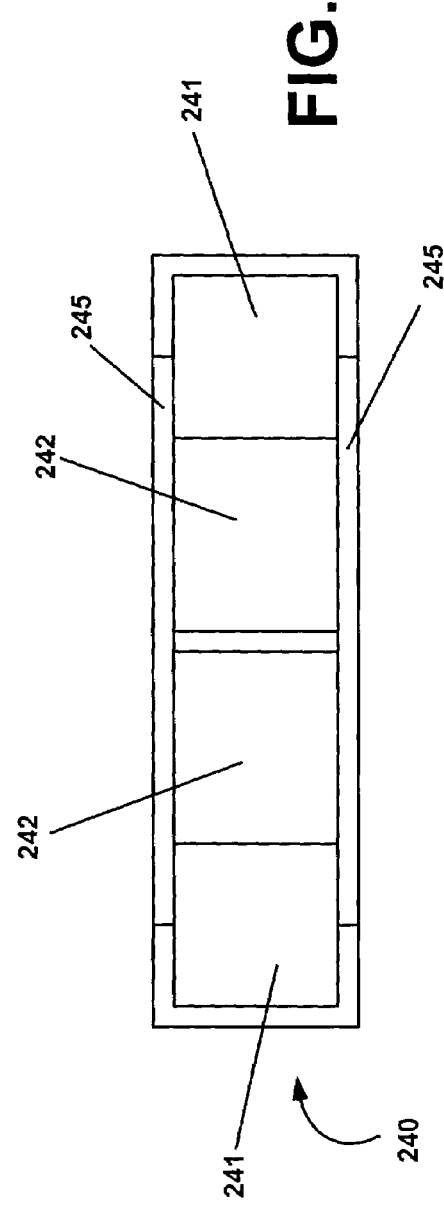

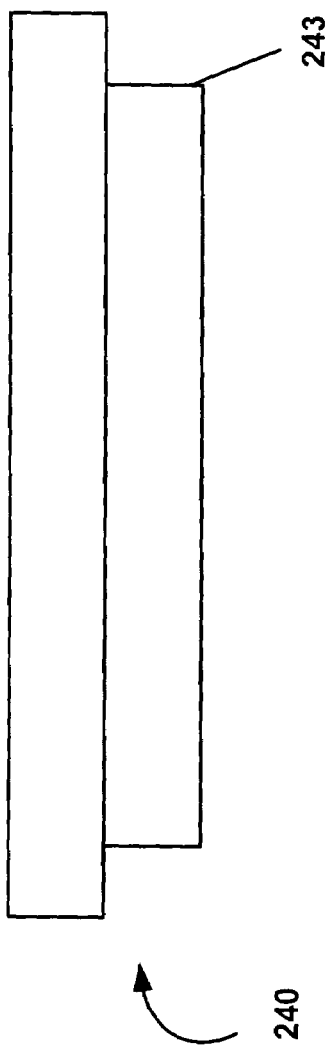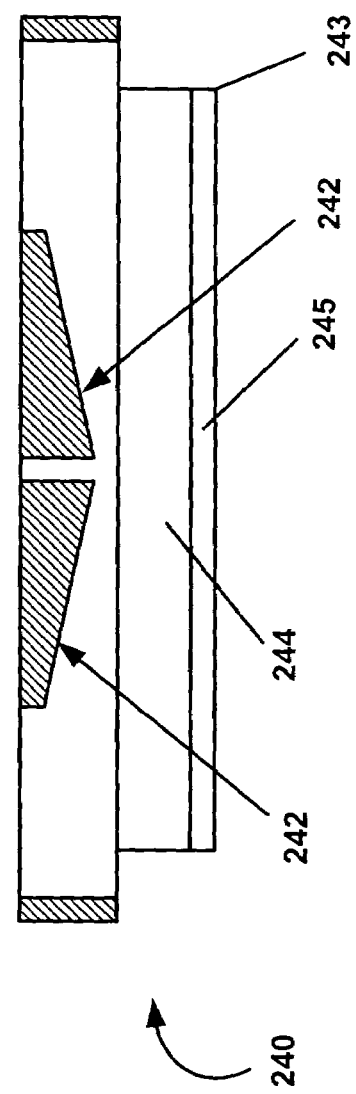

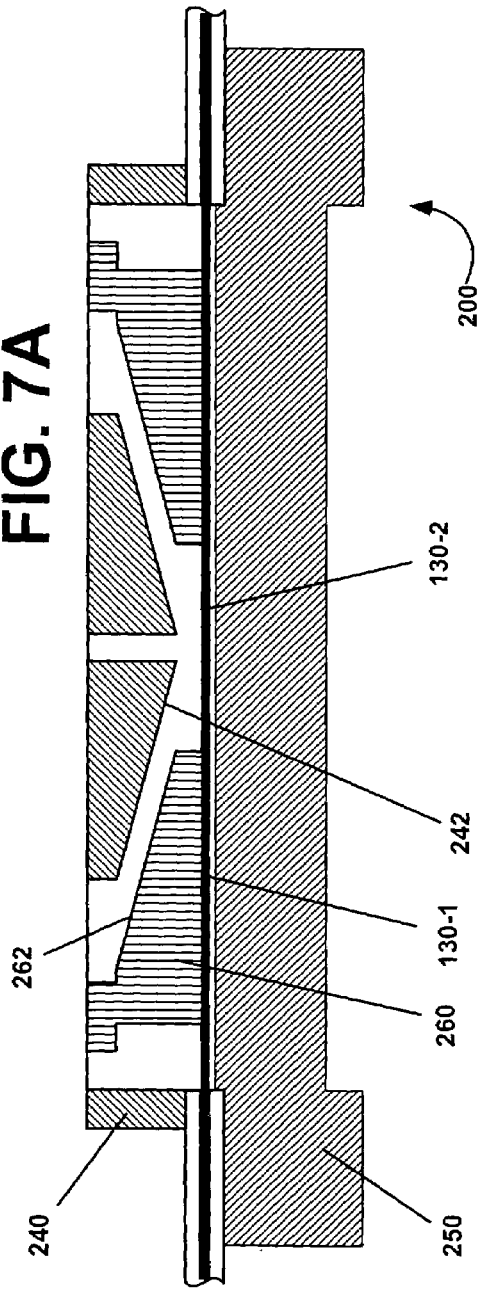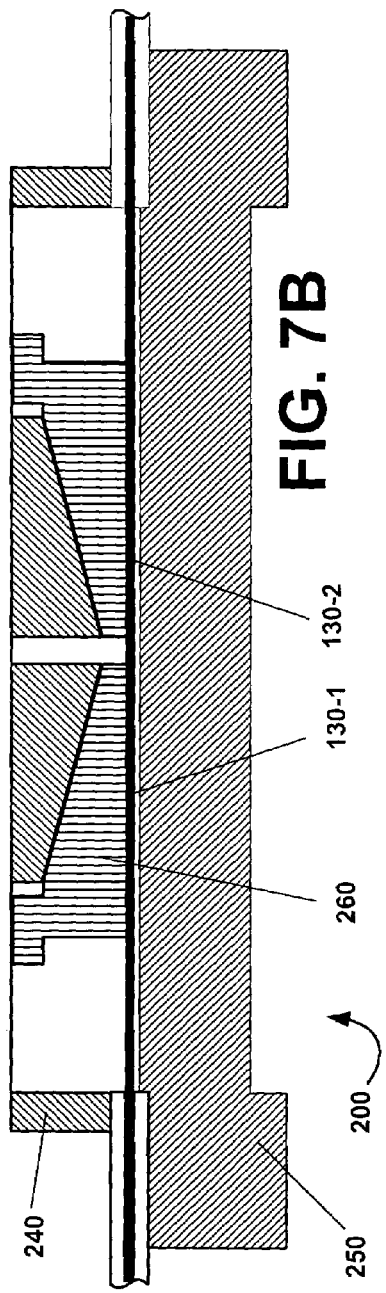

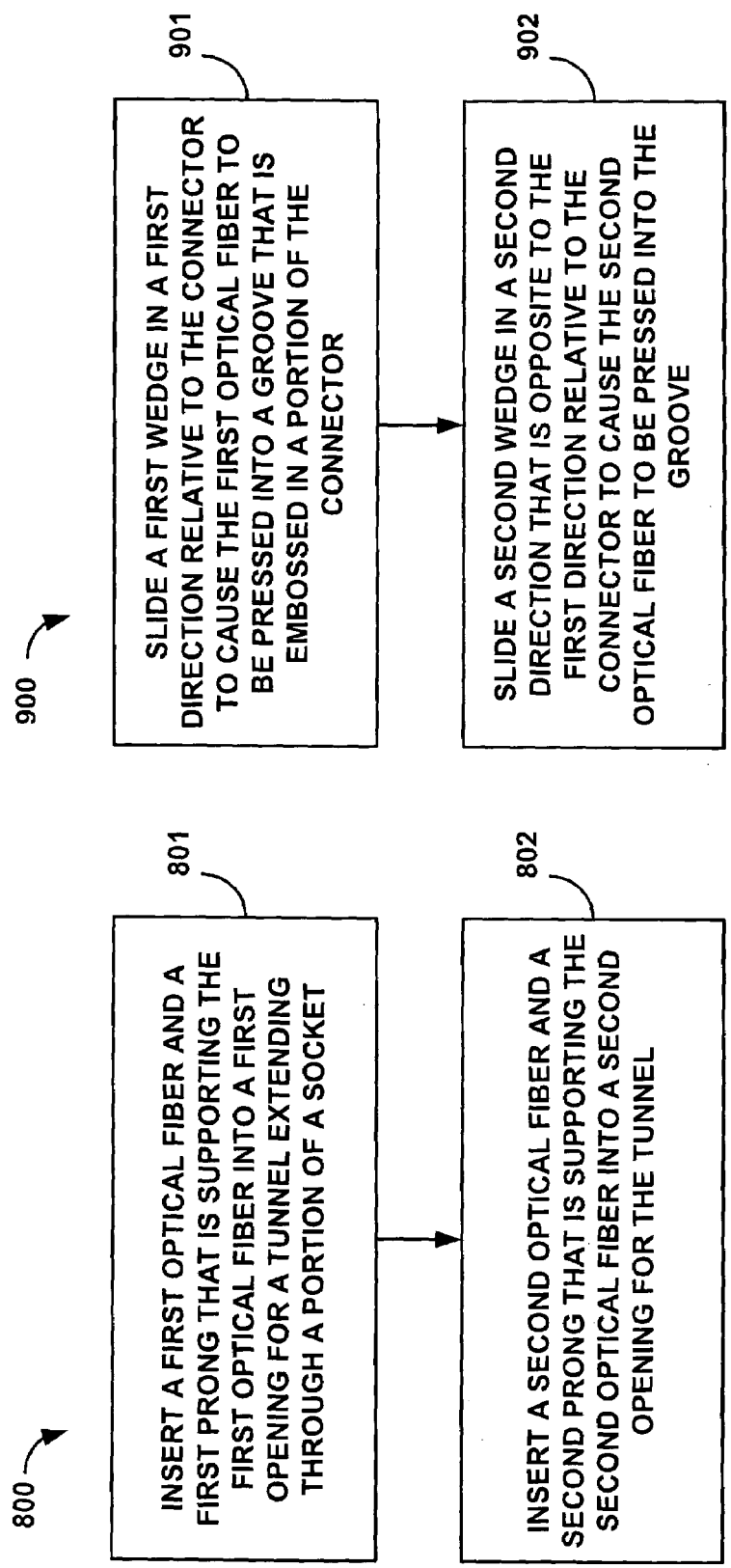

FIBER-OPTIC CONNECTORS AND RELATED METHODS

TECHNICAL FIELD

This invention relates in general to fiber-optics and, more particularly, to the field of fiber-optic connectors.

DESCRIPTION OF THE RELATED ART

Prior to the introduction of splice devices, which join optical fibers in a single splice body (discussed further below), single fiber (discrete) splice devices were used to join the optical fibers. This approach was very time consuming, however, and further resulted in a large volume of splice bodies that crowd junction boxes, or require specialized splice trays to keep the fibers organized.

Several systems have been devised to address the problem of multiple fiber splicing. One technique, mass fusion welding, requires that each fiber be placed in a groove of a rigid substrate having several such grooves. Best fit averaging is used to align the fiber pairs and an electric arc is created, melting the fiber tips and permanently fusing them together. The primary, and very significant, limitation of fusion splicing is the great expense of the fusion welders. Fusion welding also precludes later fiber removal or repositioning.

Another common multiple splicing technique requires the use of adhesives, again with a substrate or tray that has a plurality of grooves therein. The use of adhesives is generally undesirable since it adds another step to the splicing process, and may introduce contaminants to the fiber interfaces. Splice devices using adhesives also require extensive polishing of the fiber end faces to achieve acceptable light transmission, and some adhesive splices further require the use of a vacuum unit to remove trapped air.

One improvement over earlier techniques is a device that uses a foldable holder having a series of V-grooves on both sides of a central hinge region. The method of attaching the fibers to the holder, however, presents additional problems not present in earlier splices. Firstly, the cleaving of the fibers becomes a critical step since the cleave length must be exact to avoid any offset of the fiber end faces, which would be extremely detrimental to splice performance. Secondly, it is critical that the opposing V-grooves be exactly aligned, which is difficult to achieve; otherwise, there will be transverse fiber offset resulting in increased signal loss. Finally, maintaining the opposing plates perfectly parallel, which is necessary in order to optimize transverse alignment of the fiber pairs, is difficult to achieve.

SUMMARY

Fiber-optic connectors and methods for coupling optical fibers via the fiber-optic connectors are disclosed. An embodiment of a fiber-optic connector that is configured to couple a first optical fiber to a second optical fiber includes a socket having a tunnel extending through a portion of the socket, the tunnel having a first opening through a first socket surface and a second opening through a second socket surface, the first surface opposing the second surface, a first plug having a first prong that is configured to support a portion of a first optical fiber, and to be inserted with the portion of the first optical fiber into the first opening, and a second plug having a second prong that is configured to support a portion of a second optical fiber, and to be inserted with the portion of the second optical fiber into the second opening.

Another embodiment of a optical fiber connector includes a bottom portion having a groove, a top portion, and a first wedge and a second wedge that are configured to fit at least partially between the top portion and the bottom portion while the top portion is attached to the bottom portion, wherein the first wedge is configured to press a first optical fiber into the groove when the first wedge is activated by being slid toward the second wedge, and wherein the second wedge is configured to press a second optical fiber into the groove when the second wedge is activated by being slid toward the first wedge.

An embodiment of a method for coupling a first optical fiber to a second optical fiber includes inserting a first optical fiber and a first prong that is supporting the first optical fiber into a first opening for a tunnel extending through a portion of a socket, and inserting a second optical fiber and a second prong that is supporting the second optical fiber into a second opening for the tunnel, the first opening and the second opening being at opposing ends of the tunnel.

Another embodiment of a method for coupling a first optical fiber to a second optical fiber includes sliding a first wedge in a first direction relative to the connector to cause the first optical fiber to be pressed into a groove that is embossed in a portion of the connector, and sliding a second wedge in a second direction that is opposite to the first direction relative to the connector to cause the second optical fiber to be pressed into the groove.

Other systems, methods, features and advantages of the invention will be or will become apparent to one with skill in the art upon examination of the following figures and detailed description. It is intended that all such additional systems, methods, features and advantages be included within this description and be protected by the accompanying claims.

BRIEF DESCRIPTION OF THE DRAWINGS

The components in the drawings are not necessarily drawn to scale. In the drawings, like reference numerals designate corresponding parts throughout the several views.

FIGS. 1A, 1B, 1C, and 1D are schematic diagrams depicting a side view, a front view, a cross-sectional view, and a rear view, respectively, of an embodiment of a plug.

FIGS. 2A, 2B, 2C, and 2D are schematic diagrams depicting a side view, a cross-sectional view, a front view, and a rear view, respectively, of an embodiment of a socket.

FIGS. 3A and 3B are schematic diagrams depicting the operation of plugs shown in FIG. 1A–1D and a socket shown in FIG. 2.

FIGS. 4A, 4B, 4C, and 4D are schematic diagrams depicting a front view, a cross-sectional view, a side view, and a top view, respectively, of an embodiment of a base.

FIGS. 6A, 6B, 6C, and 6D are schematic diagrams depicting a top view, a bottom view, a side view, and a cross-sectional view respectively, of an embodiment of a cover that is configured to be attached to the base shown in FIGS. 4A–4D.

FIGS. 7A and 7B are schematic diagrams depicting a cross sectional view of an embodiment of a connector.

FIG. 8 is a flow chart depicting an embodiment of a method for coupling optical fibers using the plugs shown in FIG. 1A–1D and the socket shown in FIG. 2.

FIG. 9 is a flow chart depicting an example of a method for coupling optical fibers using the connector shown in FIGS. 7A and 7B.

DETAILED DESCRIPTION OF THE PREFERRED EMBODIMENTS

Fiber-optic connectors and methods for coupling optical fibers via the fiber-optic connectors are disclosed. In one embodiment, a fiber-optic connector includes a socket and two plugs. Each of these plugs includes at least one prong configured to support an optical fiber. By inserting the plugs into opposing ends of the socket, the optical fibers become optically coupled.

Another embodiment of a fiber-optic connector includes two wedges and a bottom portion having at least one groove. Optical fibers may be placed onto the grooves and the wedges may be moved toward each other to press the optical fibers into the groove. Pressing the optical fibers into the groove causes the optical fibers to be optically coupled to each other. These and other embodiments are discussed below with reference to the accompanying figures.

Figure 2C:
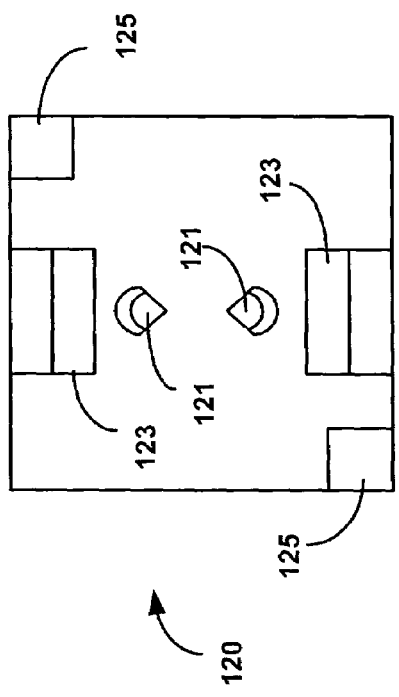
Figure 2D:
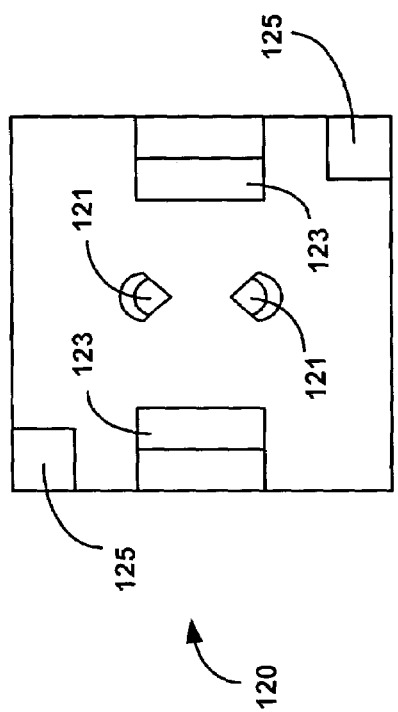
Figure 5C:
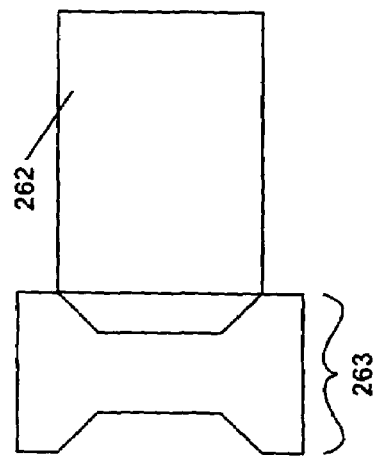
FIGS. 5A, 5B, 5C, and 5D are schematic diagrams depicting a first perspective view, a second perspective view, a top view, and a bottom view, respectively, of an embodiment of a wedge that is configured to be inserted between the base shown in FIGS. 4A–4D, and a cover shown in FIGS. 6A–6D.
Figure 5D:
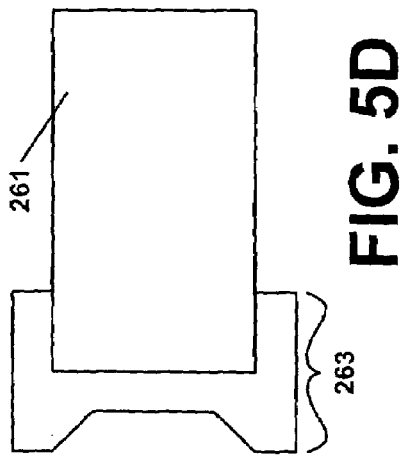
Figure 5A:
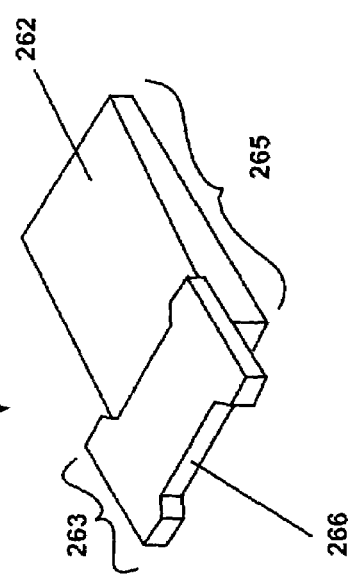
Figure 5B:
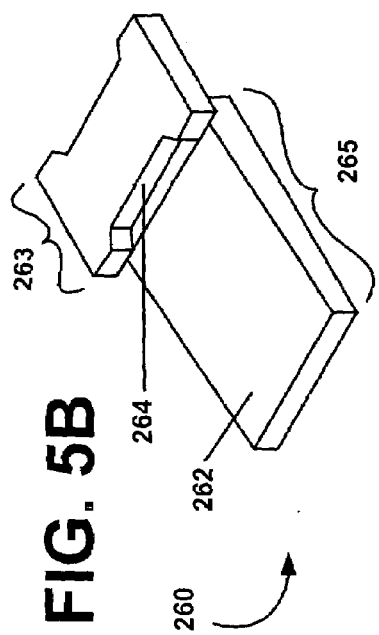

FIGS. 1A, 1B, 1C, and 1D are schematic diagrams depicting a side view, a front view, a cross-sectional view, and a rear view, respectively, of a plug 110, according to one embodiment. Each plug 110 has a tunnel 113 extending therethrough for receiving fibers via the tunnel entry 111. Furthermore, each plug 110 has two prongs 112 that are configured to be inserted into respective socket tunnels of a socket 120 (FIG. 2), and ridges 118 that are configured to be disposed against guide pins of the socket 120. Each prong 112 has a support surface 116 that is configured to support a fiber (and that is preferably flat).

FIGS. 2A, 2B, 2C, and 2D are schematic diagrams depicting a side view, a cross-sectional view, a front view, and a rear view, respectively, of a socket 120, according to one embodiment. The socket 120 has arms 122 that are configured to keep the socket 120 engaged to the plugs 110 (FIGS. 1A–1D). Each arm 122 has a catch 123 that is configured to fit within an indentation 114 in a plug 110. Each catch 123 has a catch surface 124 that is configured to be disposed against a surface 115 of a plug 110 while the socket 120 is engaged to the plug 110.

A first pair of fibers that are connected to a first plug 110-1 may be optically connected to a second pair of fibers that are connected to a second plug 110-2. This may be achieved by inserting the prongs 112 (FIG. 1) of the first plug 110-1 and the prongs 112 of the second plug 110-2 into respective openings of socket tunnels 121. More specifically, the first plug 110-1 and the second plug 110-2 are plugged into openings located on opposing surfaces of the socket 120. In this manner, each of the first pair of fibers can come into contact with one of the second pair of fibers inside a socket tunnel 121.

With additional reference to FIGS. 1A–1D and 2A–2D, FIGS. 3A and 3B are schematic diagrams depicting the operation of plugs 110 (FIG. 1A–1D) and a socket 120 (FIG. 2), according to one embodiment. As a first prong 112-1 is inserted into a first opening 131-1 of a socket tunnel 121 (FIGS. 2A–2D), a first surface 117-1 of the first prong 112-1 presses against a first surface 127-1 of the socket tunnel 121. This causes the first prong 112-1 to press a first fiber 130-1 into a V-groove 128 that defines a portion of the socket tunnel 121. Similarly, as a second prong 112-2 is inserted into a second opening 131-2 of the socket tunnel 121, a second surface 117-2 of the second prong 112-2 presses against a second surface 127-2 of the socket tunnel 121. This causes the second prong 112-2 to press the second fiber 130-2 into the V-groove 128. After the first prong 112-1 and the second prong 112-2 are inserted into the socket tunnel 121, the first fiber 130-1 becomes aligned with and optically connected to the second fiber 130-2.

FIGS. 4A, 4B, 4C, and 4D are schematic diagrams depicting a front view, a cross-sectional view, a side view, and a top view, respectively, of a base 250, according to one embodiment. The base 250 has a first series of larger V-grooves 251 and a second series of larger V-grooves 251 that are longitudinally aligned with each other and with a series of smaller V-grooves 252 that are located between the first series of larger V-grooves 251 and the second series of larger V-grooves 251. In other words, each one of larger V-grooves 251 is longitudinally aligned with a respective smaller V-groove 252 and with a respective larger V-groove 251. The larger V-grooves 251 are configured to support buffered (coated) portions of the fibers, whereas the smaller V-grooves 252 are configured to support exposed portions of the fibers. Although only two smaller V-grooves 252 and corresponding larger V-grooves 251 are shown, the base 250 may include any number of V-grooves for supporting any number of optical fibers, depending on a desired implementation.

FIGS. 5A, 5B, 5C, and 5D are schematic diagrams depicting a first perspective view, a second perspective view, a top view, and a bottom view, respectively, of a wedge 260 that is configured to be inserted between the base 250 (FIGS. 4A–4D) and a cover 240 (FIGS. 6A–6D), according to one embodiment. The wedge 260 includes a head 263 and a body 265. The head 263 has an activation surface 266 that can be pressed to activate the wedge 260, and a de-activation surface 264 that can be pressed to de-activate the wedge. The body 265 has a sloping wedge surface 262 and a bottom wedge surface 261.

FIGS. 6A, 6B, 6C, and 6D are schematic diagrams depicting a top view, a bottom view, a side view, and a cross-sectional view respectively, of a cover 240 that is configured to be attached to the base 250 (FIGS. 4A–4D), according to one embodiment. The cover 240 includes brackets 243 that are configured to keep the cover 240 attached to the base 250. When the cover 240 is attached to the base 250, the inner-surfaces 244 of the brackets 243 are disposed against respective side surfaces 253 of the base 250, and the ridges 245 of the brackets 243 are disposed against a bottom surface of the base 250. Prior to attaching the cover 240 to the base 250, the wedges 260 may be placed between the cover 240 and the base 250 (e.g., the wedges may be disposed on the base 250 prior to attaching the cover 240 to the base 250). After the cover 240 is attached to the base 250, each sloping wedge surface 262 faces a sloping cover surface 242, and each wedge head 263 is accessible via an opening 241 of the cover 240.

FIGS. 7A and 7B are schematic diagrams depicting a cross sectional view of a connector 200, according to one embodiment. Each fiber 130 may be inserted between the base 250 and a corresponding wedge 260, and may be clamped by longitudinally sliding the wedge 260 such that a sloping wedge surface 262 presses against a corresponding sloping cover surface 242. As a sloping wedge surface 262 presses against a corresponding sloping cover surface 242, a corresponding bottom wedge surface 261 (FIG. 5D) presses a fiber 130 into a smaller V-groove 252 (FIGS. 4A, 4B, and 4C), as shown in FIG. 7B.

A fiber 130 may be unclamped by longitudinally sliding a wedge 260 such that a sloping wedge surface 262 moves away from a respective sloping cover surface 242, as shown in FIG. 7A. As a sloping wedge surface 262 moves away from a sloping cover surface 242, the pressure that had been applied by a bottom wedge surface 261 on a fiber 130 is reduced, thereby allowing the fiber 130 to be removed from the connector 200.

A first fiber 130-1 may be clamped and/or unclamped independently from an opposing fiber 130-2. Therefore, a first group of fibers may be clamped using the first wedge 260-1 at an assembly plant, whereas a second group of fibers may be clamped and/or unclamped using the second wedge 260-2 at a field location. Furthermore, if the second group of fibers are to be shortened at a field location, then they may be removed from the connector 200, cut to a desired length, and then re-coupled to the first group of fibers using the connector 200 as discussed above.

FIG. 8 is a flow chart depicting an example of a method 800 for coupling a first optical fiber 130-1 to a second optical fiber 130-2 (FIG. 3A). As indicated in step 801, the first optical fiber 130-1 and a first prong 112-1 that is supporting the first optical fiber 130-1 are inserted into a first opening 131-1 for a tunnel 121 extending through a portion of a socket 120. Then a second optical fiber 130-2 and a second prong 112-2 that is supporting the second optical fiber 130-2 are inserted into a second opening 131-2 f6r the tunnel 121, as indicated in step 802. The first opening 131-1 and the second opening 131-2 are at opposing ends of the tunnel 121. Consequently, inserting the second prong 112-2 into the second opening 131-2 and inserting the first prong 112-1 into the first opening 131-1 causes the second optical fiber 130-2 to be optically coupled to the first optical fiber 130-1.

In one embodiment, the first prong 112-1 is part of a first plug 110 (FIG. 1A) that has a tunnel 121 extending through it for receiving a portion of the first optical fiber 130-1. Similarly the second prong 112-2 is part of a second plug 110 that has a tunnel 121 extending through it for receiving a portion of the second optical fiber 130-2. The first and second plugs 110 each preferably comprise multiple prongs 112 that are configured to be inserted into respective openings 131 in the socket 120. Each of these prongs 112 has a support surface 116 that is configured to support a portion of an optical fiber 130.

FIG. 9 is a flow chart depicting an example of a method 900 for coupling a first optical fiber 130-1 to a second optical fiber 130-2 via a connector 200. As indicated in step 901, a first wedge 260 is slid in a first direction relative to the connector 200 to cause the first optical fiber 130-1 to be pressed into a groove 252 (FIG. 4D) that is embossed in a portion of the connector 200. Then, a second wedge 260 is slid in a second direction that is opposite to the first direction relative to the connector 200 to cause the second optical fiber 130-2 to be pressed into the groove 252, as indicated in step 902. As a result of sliding the first and second wedges 260 in opposite directions, the first optical fiber 130-1 and the second optical fiber 130-2 become optically coupled.

In one embodiment, sliding the first wedge 260 in the first direction causes a first set of optical fibers 130 to be pressed into a set of respective of grooves 252 that are embossed in a portion of the connector 200. Similarly, sliding the second wedge 260 in the opposite direction causes a second set of optical fibers 130 to be pressed into the same set of respective of grooves 252. As a result of sliding the first and second wedges 260 in opposite directions, each of the first set of optical fibers 130 becomes optically coupled to a respective fiber from the second set of optical fibers 130.

It should be emphasized that the above-described embodiments are merely possible examples of implementations. Many variations and modifications may be made to the above-described embodiments. All such modifications and variations are intended to be included herein within the scope of the disclosure and protected by the following claims.

What is claimed is:

1. An optical fiber connector comprising:
a bottom portion having a groove; a top portion; and a first wedge and a second wedge that are configured to fit at least partially between the top portion and the bottom portion while the top portion is attached to the bottom portion; wherein the first wedge is configured to bear against and to press a first optical fiber into the groove when the first wedge is activated by being slid toward the second wedge; and wherein the second wedge is configured to bear against and to press a second optical fiber into the groove when the second wedge is activated by being slid toward the first wedge; at least one of said wedges being movable a distance sufficient to produce an optical coupling of the fibers.

2. The optical fiber connector of claim 1, wherein the connector is configured such that when the first wedge and the second wedge are activated, the first optical fiber and the second optical fiber are optically coupled.

3. The optical fiber connector of claim 1, wherein the first wedge is configured to reduce an amount of pressure applied on the first optical fiber by the first wedge when the first wedge is de-activated by being slid away from the second wedge.

4. The optical fiber connector of claim 1, wherein the first wedge is configured to enable the first optical fiber to be removed from the optical fiber connector when the first wedge is de-activated by being slid away from the second wedge.

5. The optical fiber connector of claim 1, wherein the second wedge is configured to reduce an amount of pressure applied on the second optical fiber when the second wedge is de-activated by being slid away from the first wedge.

6. The optical fiber connector of claim 1, wherein the second wedge is configured to enable the second optical fiber to be removed from the optical fiber connector when the second wedge is de-activated by being slid away from the first wedge.

7. The optical fiber connector of claim 1, wherein the first wedge is configured to press a first plurality of optical fibers into a plurality of grooves in the bottom portion when the first wedge is activated, and the second wedge is configured to press a second plurality of optical fibers into the plurality of grooves when the second wedge is activated.

8. The optical fiber connector of claim 1, wherein the bottom portion has a plurality of larger V-grooves and a plurality of smaller V-grooves, each larger V-groove being wider than each smaller V-groove.

9. The optical fiber connector of claim 8, wherein each larger V-grooves is longitudinally aligned with a respective smaller V-groove and with a respective larger V-groove.

10. The optical fiber connector of claim 9, wherein the plurality of larger V-grooves are configured to support buffered portions of respective optical fibers.

11. The optical fiber connector of claim 10, wherein the plurality of smaller V-grooves are configured to support exposed portions of respective optical fibers.

12. The optical fiber connector of claim 1, wherein the first wedge and the second wedge each include a head portion and a body portion.

13. The optical fiber connector of claim 12, wherein the body portion has a sloping wedge surface and a bottom wedge surface.

14. The optical fiber connector of claim 13, wherein each head portion has an activation surface that can be pressed to activate a corresponding wedge, and a de-activation surface that can be pressed to de-activate the corresponding wedge.

15. The optical fiber connector of claim 14, wherein the first wedge and the second wedge are placed between the top portion and the bottom portion before the top portion is attached to the bottom portion.

16. The optical fiber connector of claim 15, wherein after the top portion is attached to the bottom portion, each sloping wedge surface faces a sloping bottom surface of the top portion, and each wedge head is accessible via an opening in the top portion.

17. The optical fiber connector of claim 16, wherein sliding the first wedge toward the second wedge causes the sloping wedge surface of the first wedge to press against a respective one of the sloping bottom surfaces of the top portion.

* * * * *